(12) United States Patent
Hirano et al.

(10) Patent No.: US 9,319,261 B2
(45) Date of Patent: Apr. 19, 2016

(54) TRANSMISSION APPARATUS

(71) Applicant: Panasonic Corporation, Osaka (JP)

(72) Inventors: Shunsuke Hirano, Kanagawa (JP); Atsushi Yoshimoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/401,085

(22) PCT Filed: Mar. 14, 2014

(86) PCT No.: PCT/JP2014/001473
§ 371 (c)(1),
(2) Date: Nov. 13, 2014

(87) PCT Pub. No.: WO2014/141723
PCT Pub. Date: Sep. 18, 2014

(65) Prior Publication Data
US 2015/0156054 A1 Jun. 4, 2015

(30) Foreign Application Priority Data

Mar. 15, 2013 (JP) .................................. 2013-053820

(51) Int. Cl.
*H04B 17/00* (2015.01)
*H04L 27/36* (2006.01)
(Continued)

(52) U.S. Cl.
CPC ............... *H04L 27/364* (2013.01); *H04B 1/04* (2013.01); *H04B 1/0475* (2013.01); *H04L 27/00* (2013.01); *H04L 27/36* (2013.01); *H04B 2001/0416* (2013.01)

(58) Field of Classification Search
CPC ................ H04L 27/04; H04B 1/0475; H03D 2200/0047

USPC ................ 455/73, 126, 115.1, 67.11, 102, 91
See application file for complete search history.

(56) References Cited

U.S. PATENT DOCUMENTS 6,999,737 B2 * 2/2006 Ishihara ............... H03G 3/3042
455/115.1
7,209,717 B2 * 4/2007 Okada ................... H03F 1/0205
455/126
(Continued)

FOREIGN PATENT DOCUMENTS

JP 08-018612 A 1/1996
JP 2000-114994 A 4/2000
(Continued)

OTHER PUBLICATIONS

International Search Report, mailed Apr. 28, 2014, for International Application No. PCT/JP2014/001473, 4 pages.
(Continued)

*Primary Examiner* — Sonny Trinh
(74) *Attorney, Agent, or Firm* — Seed IP Law Group PLLC (57) ABSTRACT

A square detection circuit square-detects a portion of a high frequency transmission signal that is extracted by a directional coupler, of a high frequency transmission signal amplified by a power amplifier. A first adjustment circuit extracts a DC component from a detection output of the square detection circuit, and adjusts respective amplitudes of baseband I and Q signals generated by an I/Q signal generation circuit, in response to the extracted DC component. A second adjustment circuit extracts an AC component from the detection output of the square detection circuit, and adjusts the respective amplitudes and phases, and the respective DC offsets of the baseband I and Q signals generated by the I/Q signal generation circuit, in response to the extracted AC component.

5 Claims, 6 Drawing Sheets

(51) Int. Cl.
*H04B 1/04* (2006.01)
*H04L 27/00* (2006.01)

(56) References Cited

U.S. PATENT DOCUMENTS

| | | | | |
|---|---|---|---|---|
| 7,274,317 B2 * | 9/2007 | Eo | ............................ | H04B 1/30 341/133 |
| 7,366,481 B2 * | 4/2008 | Okada | .................. | H03F 1/0205 455/126 |
| 7,463,091 B2 * | 12/2008 | Toyota | .................. | H03F 1/0261 330/129 |
| 7,724,837 B2 * | 5/2010 | Filimonov | ............... | H03C 3/40 375/295 |
| 7,734,261 B2 * | 6/2010 | Bury | ..................... | H04L 27/364 455/102 |
| 8,385,458 B2 | 2/2013 | Yanagisawa et al. | | |
| 2004/0252782 A1 | 12/2004 | Demir et al. | | |
| 2009/0213960 A1 * | 8/2009 | Ikeda | .................... | H04L 27/364 375/296 |
| 2010/0195706 A1 | 8/2010 | Yanagisawa et al. | | |
| 2010/0198540 A1 | 8/2010 | Yanagisawa et al. | | |
| 2011/0051843 A1 | 3/2011 | Otsuka et al. | | |

FOREIGN PATENT DOCUMENTS

| | | |
|---|---|---|
| JP | 2001-044762 A | 2/2001 |
| JP | 2006-041631 A | 2/2006 |
| JP | 2006-527530 A | 11/2006 |
| JP | 2008-124836 A | 5/2008 |
| JP | 2009-206556 A | 9/2009 |
| JP | 2011-049874 A | 3/2011 |
| JP | 2011-103541 A | 5/2011 |
| JP | 2012-004936 A | 1/2012 |
| WO | 2008/018263 A1 | 2/2008 |
| WO | 2009/008445 A1 | 1/2009 |

OTHER PUBLICATIONS

Lee et al., "A Highly Linear Direct-Conversion Transmit Mixer Transconductance Stage with Local Oscillation Feedthrough and I/Q Imbalance Cancellation Scheme," ISSCC 2006, Session 20, WLAN/WPAN, 20.4, 2006, 10 pages.

Japanese Notice of Reasons for Refusal dated Jan. 5, 2016, for corresponding JP Application No. 2013-053820, 7 pages.

* cited by examiner

TRANSMISSION APPARATUS

TECHNICAL FIELD

The present disclosure relates to a transmission apparatus which transmits a high frequency signal.

BACKGROUND ART

As a Radio Frequency (RF) circuit in a wireless communication field using a millimeter-wave band is made from a Complementary Metal Oxide Semiconductor (CMOS), study has been undertaken for reducing the size and power of the RF circuit for commercialization thereof.

In specific low power wireless communication using the millimeter-wave band such as a 60 GHz band, the strength of transmission radio waves is defined. In a high frequency region such as the millimeter-wave band, the characteristics greatly change depending on a change in a process, a temperature, and a power supply voltage of a transistor. Thus, it is necessary to control the power of a high frequency transmission signal. In other words, since the power is measured by monitoring the high frequency transmission signal, it is necessary to control the power of the high frequency transmission signal to be a constant value.

As a related art of controlling the power of the high frequency transmission signal, a TDMA transmitter has been known which measures the power of the high frequency transmission signal which is amplified by a power amplifier and obtains desired constant power (for example, see Patent Literature 1).

Further, if there is a DC offset in an in-phase signal (I signal: In-phase) and a quadrature signal (Q signal: Quadrature) in a quadrature modulator that generates a high frequency transmission signal, carrier leakage occurs in the high frequency transmission signal. Further, if there is an imbalance in the amplitudes and the phases of the I and Q signals in the quadrature modulator that generates the high frequency transmission signal, image leakage occurs in the high frequency transmission signal.

A transmission apparatus has been known which adjusts respective amplitudes and phases of an I signal and a Q signal by using a detection output obtained by detecting a portion of a high frequency transmission signal which is generated by a quadrature modulator so as to reduce carrier leakage and image leakage occurring in the high frequency transmission signal (for example, see Non Patent Literature 1).

CITATION LIST

Patent Literature

Patent Literature 1: JP-A-2000-114994

Non Patent Literature

Non Patent Literature 1: C. Paul Lee, et al., 'A Highly Linear Direct-Conversion Transmit Mixer Transconductance Stage with Local Oscillation Feedthrough and I/Q Imbalance Cancellation Scheme', IEEE International Solid-State Circuits Conference, 2006

SUMMARY OF INVENTION

Technical Problem

In Patent Literature 1, the desired constant power of the high frequency transmission signal is obtained, but reducing the carrier leakage and the image leakage occurring in the high frequency transmission signal is not considered. In the same manner, in Non Patent Literature 1, it is possible to reduce the carrier leakage and the image leakage occurring in the high frequency transmission signal, but obtaining the desired constant power of the high frequency transmission signal is not considered.

Therefore, in Patent Literature 1 and Non Patent Literature 1, it is only possible to cope with either one among reducing the carrier leakage and the image leakage occurring in the high frequency transmission signal, or controlling power to obtain the desired constant power of the high frequency transmission signal.

Therefore, for example, even if the desired constant power of the high frequency transmission signal is obtained, it is difficult to reduce the carrier leakage and the image leakage occurring in the high frequency transmission signal, and thus there is a problem of having difficulty in improving a modulation accuracy characteristic of a transmission signal.

Further, even if the carrier leakage and the image leakage occurring in the high frequency transmission signal may be reduced and thus the modulation accuracy characteristic of the transmission signal is improved, there is a problem of not obtaining the desired constant power of the high frequency transmission signal.

In order to solve the above problems in the related art, an object of the present disclosure is to provide a transmission apparatus which controls the power of the high frequency transmission signal to be a constant value and suppresses the carrier leakage and the image leakage.

Solution to Problem

The present disclosure is a transmission apparatus including: a modulator that modulates a local oscillator signal by using an in-phase signal and a quadrature signal of a baseband, and generates a high frequency signal; a power amplifier that amplifies the generated high frequency signal; a coupler that extracts a portion of the high frequency signal, from the amplified high frequency signal; a detection circuit that detects the extracted high frequency signal; a first adjustment circuit that extracts a DC component from a detection output of the detection circuit, and adjusts respective amplitudes of the in-phase signal and the quadrature signal of the baseband, in response to the extracted DC component; and a second adjustment circuit that extracts an AC component from the detection output of the detection circuit, and adjusts an amplitude, a phase and a DC offset of the in-phase signal and the quadrature signal of the baseband, in response to the extracted AC component.

Advantageous Effects of Invention

According to the present disclosure, it is possible to suppress the carrier leakage and the image leakage and to control the power of the high frequency transmission signal to be a constant value, thereby improving the modulation accuracy characteristic of the transmission signal.

BRIEF DESCRIPTION OF DRAWINGS

In FIG. 2, (A) is a diagram illustrating a power spectrum of a high frequency transmission signal which is amplified by a power amplifier, and (B) is a diagram illustrating a power spectrum of a square detection output signal of a square detection circuit.

In FIG. 6, (A) is a diagram illustrating a power spectrum of a high frequency transmission signal which is an output of a modulator, and (B) is a diagram illustrating a power spectrum of an output signal of the square detection circuit.

DESCRIPTION OF EMBODIMENTS (Background of Respective Embodiments)

Figure 4:
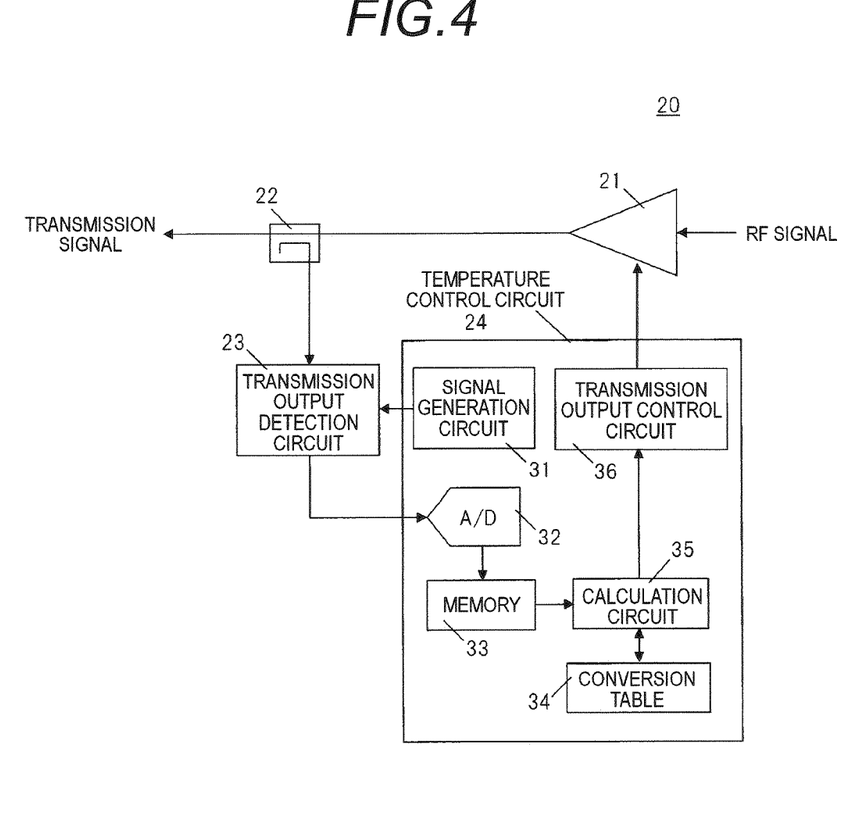
FIG. 4 is a diagram illustrating an example of a circuit configuration of a transmission apparatus in the related art.

First, before respective embodiments of a transmission apparatus according to the present disclosure are described, a background of the respective embodiments will be described with reference to FIGS. 4 to 6. FIG. 4 is a diagram illustrating an example of a circuit configuration of a transmission apparatus 20 in the related art (see Patent Literature 1). The transmission apparatus 20 illustrated in FIG. 4 includes a power amplification circuit 21, a directional coupler 22, a transmission output detection circuit 23, and a temperature control circuit 24. The temperature control circuit 24 includes a signal generation circuit 31, an A/D converter 32, a memory 33, a conversion table 34, a calculation circuit 35, and a transmission output control circuit 36.

The power amplification circuit 21 amplifies an input high frequency signal (RF signal). The RF signal amplified by the power amplification circuit 21 is transmitted through a transmission antenna which is not shown, is taken out by the directional coupler 22, and is input to the transmission output detection circuit 23. The transmission output detection circuit 23 detects an RF signal that is taken out by the directional coupler 22, and outputs a detection result to the A/D converter 32. Since the temperature control circuit 24 obtains a temperature compensation value so as to control the power amplification circuit 21, based on the detection output from the transmission output detection circuit 23, the prescribed power of the transmission signal can be obtained.

The transmission apparatus 20 illustrated in FIG. 4 is a TDMA transmitter, and when a burst signal is stopped, the transmission apparatus 20 outputs a measurement signal from the signal generation circuit 31 to the transmission output detection circuit 23, and stores the detection output of the transmission output detection circuit 23 in the memory 33 through the A/D converter 32. The transmission apparatus 20 obtains a temperature correction value of the calculation circuit 35, based on the conversion table 34 which has been registered in advance.

Further, when the burst signal is transmitted, the transmission apparatus 20 digitizes the detection output from the transmission output detection circuit 23 in the A/D converter 32, obtains a compensated detection value by correcting the digitized detection output by using the temperature correction value obtained when the burst signal is stopped, and controls the power amplification circuit 21 by using the compensated detection value in the transmission output control circuit 36. Thus, the transmission apparatus 20 obtains the compensated detection value without using temperature compensation components, and obtains a constant transmission output (power), irrespective of the change in the ambient temperature.

Figure 5:
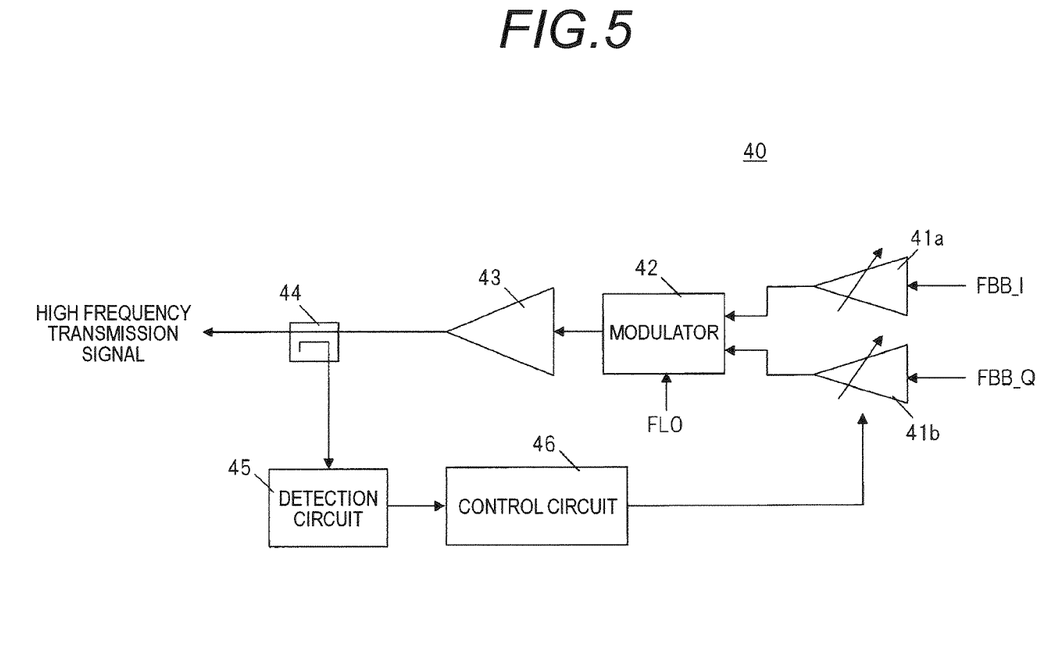
FIG. 5 is a diagram illustrating another example of a circuit configuration of a transmission apparatus in the related art.

FIG. 5 is a diagram illustrating another example of a circuit configuration of a transmission apparatus 40 in the related art (see Non Patent Literature 1). The transmission apparatus 40 illustrated in FIG. 5 includes variable gain amplifiers 41a and 41b, a modulator 42, a power amplification circuit 43, a directional coupler 44, a detection circuit 45, and a control circuit 46.

The variable gain amplifier 41a changes a gain in response to a control signal generated by the control circuit 46, and amplifies an input baseband I signal (frequency FBB_I) and outputs the amplified I signal to the modulator 42. The variable gain amplifier 41b changes a gain in response to the control signal generated by the control circuit 46, and amplifies an input baseband Q signal (frequency FBB_Q) and outputs the amplified Q signal to the modulator 42. Further, in FIG. 5, in order to avoid complication of the drawings, an arrow from the control circuit 46 to the variable gain amplifier 41a is omitted.

The modulator 42 receives the baseband I signal amplified by the variable gain amplifier 41a, the baseband Q signal amplified by the variable gain amplifier 41b, and a local signal (frequency FLO), quadrature-modulates the local signal by using the baseband I and Q signals so as to generate a high frequency transmission signal, and outputs the high frequency transmission signal to the power amplification circuit 43.

The power amplification circuit 43 amplifies the high frequency transmission signal generated by the modulator 42. The high frequency transmission signal amplified by the power amplification circuit 43 is transmitted through a transmission antenna, not shown, taken out by the directional coupler 44, and input to the detection circuit 45. The detection circuit 45 detects the high frequency transmission signal which is taken out by the directional coupler 44, and outputs the detection result to the control circuit 46.

The control circuit 46 generates a control signal for adjusting a balance of the amplitudes and the phases of the baseband I and Q signals, and a DC offset of the I and Q signals, based on the detection result of the detection circuit 45, and outputs the generated control signal to the variable gain amplifiers 41a and 41b. Thus, the transmission apparatus 40 illustrated in FIG. 5 reduces the carrier leakage and the image leakage occurring in the high frequency transmission signal.

Here, if there is an imbalance in the amplitudes and the phases of the baseband I and Q signals which are input to the modulator 42 illustrated in FIG. 5 and a DC offset of the I and Q signals, the modulation accuracy characteristic of the transmission signal deteriorates.

Specifically, if there is an amplitude error or a phase error in the I and Q signals, there is an imbalance in the amplitudes or the phases of the I and Q signals, and an image leakage occurs in the high frequency transmission signal generated by the modulator 42. Further, if there is the DC offset in the I and Q signals, carrier leakage occurs in the high frequency transmission signal generated by the modulator 42. Therefore, the modulation accuracy characteristic of the transmission signal deteriorates.

Thus, in the transmission apparatus 50 illustrated in FIG. 5, the control circuit 46 adjusts the amplitudes and phases and the DC offset of the baseband I and Q signals, based on the detection result of the high frequency transmission signal amplified by the power amplification circuit 43, and thus the carrier leakage and the image leakage occurring in the high frequency transmission signal are reduced.

The adjustment of the amplitudes and phases and the DC offset of the baseband I and Q signals in the control circuit 46 will be described with reference to FIG. 6. In FIG. 6, (A) is a diagram illustrating a power spectrum of a high frequency transmission signal which is an output of the modulator 42. In FIG. 6, (B) is a diagram illustrating a power spectrum of an output signal in a case of using the square detection circuit which is the detection circuit 45.

Figure 6:
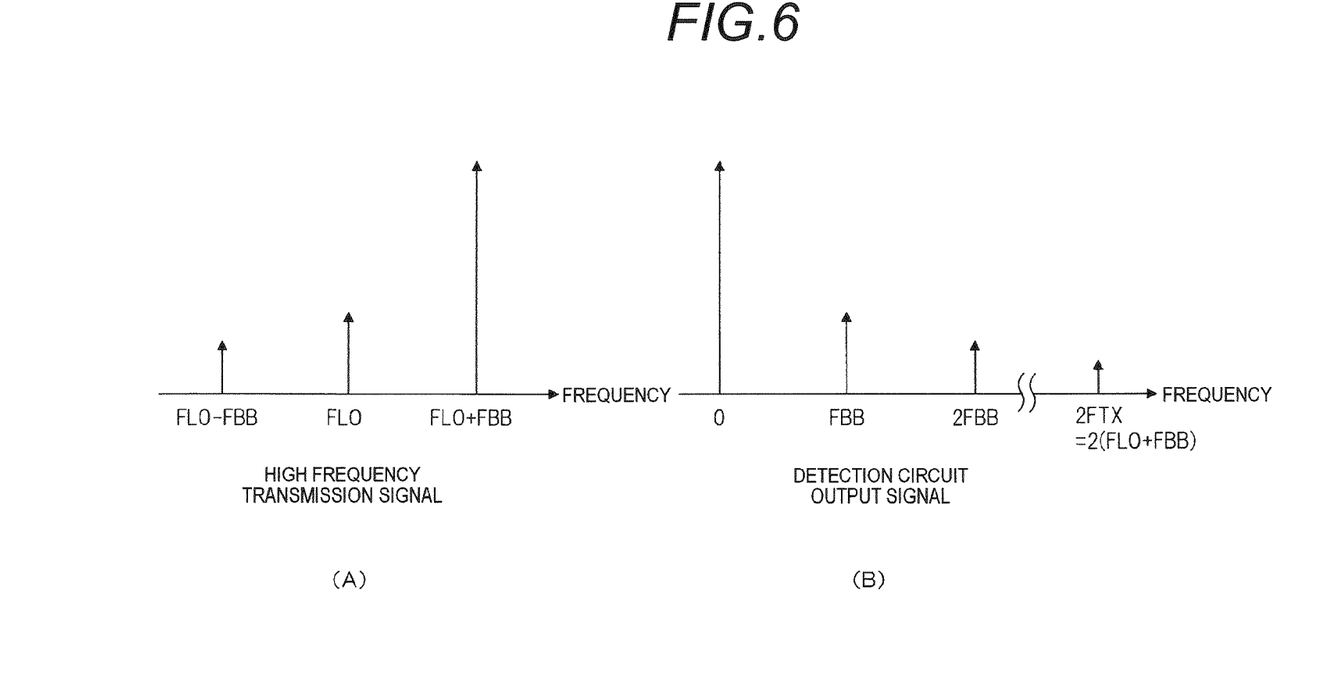

For example, if an I signal (frequency FBB_I) and a Q signal (frequency FBB_Q) which are two tone signals having a phase difference of 90 degrees are input to the modulator 42, a high frequency transmission signal which is a modulation wave appears at a frequency (FLO+FBB) (see (A) of FIG. 6). Further, the carrier leakage caused by the DC offset of the I and Q signals which are the tone signals appears at a frequency FLO, and the image leakage caused by the imbalance of the amplitudes and phases of the I and Q signals which are the tone signals appears at a frequency (FLO−FBB) (see (A) of FIG. 6).

In a case of using the square detection circuit as the detection circuit 45, the power spectrum of a frequency FBB represents the level of the carrier leakage (see (B) of FIG. 6). Further, the power spectrum of a frequency 2FBB represents the level of the image leakage. Further, the power spectrum of the DC component (frequency 0) and the power spectrum of a frequency 2FTX appear (see (B) of FIG. 6). In addition, the frequency FTX is a frequency "FLO+FBB" shown in FIG. 6.

The control circuit 46 generates a control signal for adjusting the DC offset of the I and Q signals which are the tone signals such that the detection result of the detection circuit 45, that is, the level of the power spectrum at the frequency FBB illustrated in (B) of FIG. 6 is at a minimum. Thus, the transmission apparatus 40 can reduce the level of the carrier leakage occurring in the high frequency transmission signal, thereby improving the modulation accuracy characteristic.

The control circuit 46 generates a control signal for adjusting the balance of the phases and amplitudes of the I and Q signals which are the tone signals such that the detection result of the detection circuit 45, that is, the level of the power spectrum at the frequency 2FBB illustrated in (B) of FIG. 6 is at a minimum. Thus, the transmission apparatus 40 can reduce the level of the image leakage occurring in the high frequency transmission signal, thereby improving the modulation accuracy characteristic.

Although the examples of the transmission apparatus used in the wireless Local Area Network (LAN) are described in Patent Literature 1 and Non Patent Literature 1, even when, for example, millimeter waves of a 60 GHz band are applied to broadband wireless communication, similarly, it is necessary to control the power of the high frequency transmission signal and to adjust the imbalance of the amplitudes and phases of the baseband I and Q signals and the DC offset of the I and Q signals.

Further, when the configuration of the transmission apparatus illustrated in FIG. 4 or FIG. 5 is applied to the broadband wireless communication using the millimeter waves of the 60 GHz band, it is necessary to minimize the loss of the high frequency transmission signal in a connection between a directional coupler and a detection circuit.

For example, in the case of adjusting the amplitudes, phases and the DC offset of the baseband I and Q signals, the wireless communication using the millimeter waves of 60 GHz is broadband wireless communication. Thus, it is necessary to set also the frequency of the baseband signal to be as high as a few hundred MHz. Therefore, the control circuit 46 illustrated in FIG. 5 adjusts the balance of the I and Q signals of a few hundred MHz, based on the detection result of the detection circuit 45, and thus the power consumption of the transmission apparatus increases.

Thus, in the following embodiments, an example of a transmission apparatus which suppresses the carrier leakage and the image leakage, further, and controls the power of the high frequency transmission signal to be a constant value will be described.

(Description of the Embodiment)

Figure 1:
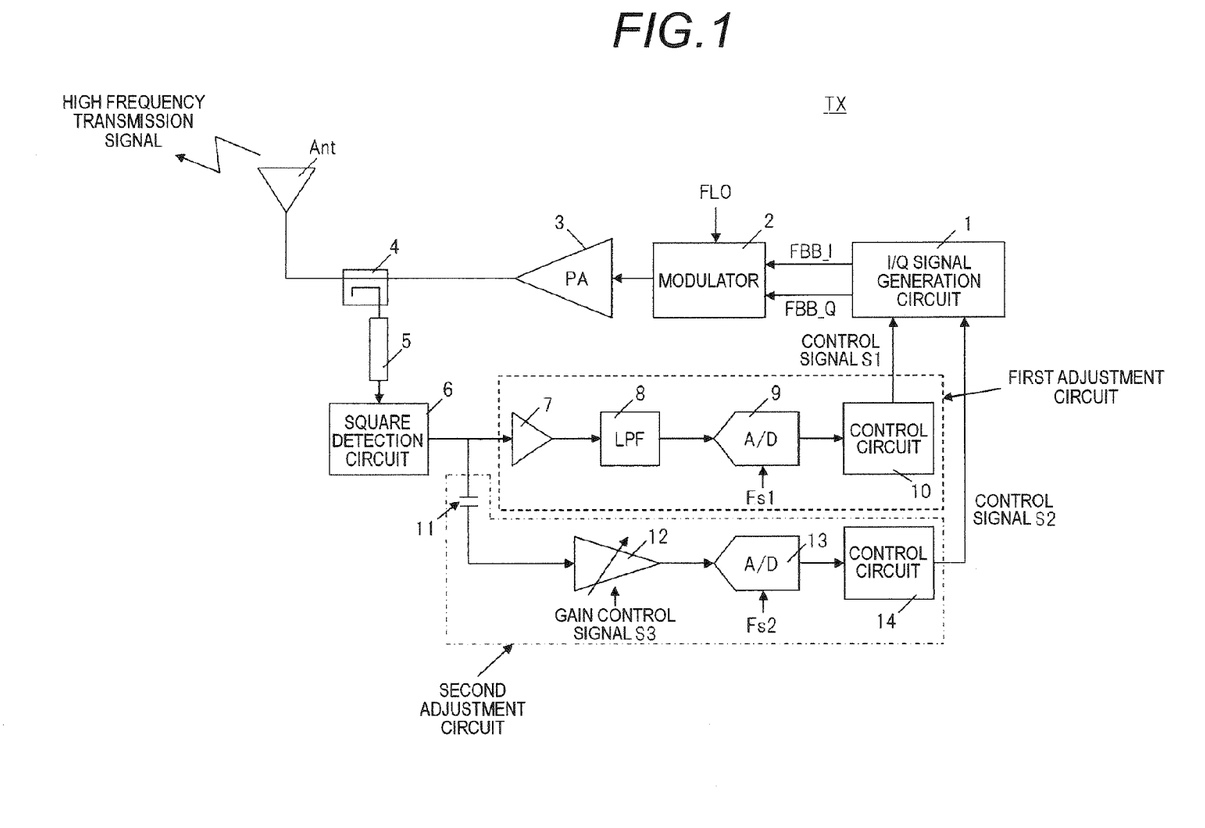
FIG. 1 is a diagram illustrating an example of a circuit configuration of a transmission apparatus of the present embodiment.

FIG. 1 is a diagram illustrating an example of a circuit configuration of a transmission apparatus TX of the present embodiment. The transmission apparatus TX illustrated in FIG. 1 includes an I/Q signal generation circuit 1, a modulator 2, a power amplifier (PA) 3, a transmission antenna Ant, a directional coupler 4, a transmission channel 5, a square detection circuit 6, an amplifier 7, a Low Pass Filter (LPF) 8, an A/D converter 9, a control circuit 10, a capacitor 11, a variable gain amplifier 12, an A/D converter 13, and a control circuit 14.

The I/Q signal generation circuit 1 generates a baseband in-phase signal (I signal) and a baseband quadrature signal (Q signal) and outputs the generated I and Q signals to the modulator 2. Further, the I/Q signal generation circuit 1 generates a baseband in-phase signal (I signal) and a baseband quadrature signal (Q signal), in response to the control signals generated by respective control circuits 10 and 14 which will be described later.

The modulator 2 is, for example, a quadrature modulator, and receives the baseband I and Q signals generated by the I/Q signal generation circuit 1 and a local oscillator signal (local signal: frequency FLO) generated by a local oscillator (not shown), and quadrature-modulates the local signal by using the baseband I and Q signals. The modulator 2 outputs a transmission signal of a high frequency (for example, a millimeter-wave band of a 60 GHz band) generated through the quadrature-modulation, to the power amplifier 3.

The power amplifier 3 amplifies a high frequency transmission signal generated by the modulator 2 and outputs the amplified signal to the transmission antenna Ant. From the high frequency transmission signal amplified by the power amplifier 3, a portion of the high frequency transmission signal is extracted by the directional coupler 4 which is a coupler, and is input to the square detection circuit 6 through the transmission channel 5. In other words, the high frequency transmission signal which is extracted (taken out) by the directional coupler 4 is transmitted to the square detection circuit 6 through the transmission channel 5.

The square detection circuit 6 which is a detection circuit square-detects the high frequency transmission signal which is transmitted through the transmission channel 5, and outputs a square detection output signal including a direct current (DC) component and an alternating current (AC) component, to the amplifier 7 and the capacitor 11.

In other words, in the present embodiment, the square detection output signal of the square detection circuit 6 branches into two systems: one is input to a first adjustment circuit (see below) including the amplifier 7, and the other is input to a second adjustment circuit (see below) including the capacitor 11. In addition, the circuit configuration of the square detection circuit 6 will be described later with reference to FIG. 3.

The amplifier 7 amplifies the square detection output signal of the square detection circuit 6, and outputs the amplified signal to the LPF 8. In addition, the circuit configuration of the amplifier 7 will be described later with reference to FIG. 3.

The LPF 8 which is a filter extracts the DC component of a low frequency (frequency 0) by cutting off an AC component of a high frequency from the square detection output signal amplified by the amplifier 7, and outputs the extracted DC component to the A/D converter 9.

The A/D converter 9 performs A/D conversion on the output signal of the LPF 8 at a sampling frequency Fs1, and outputs a digital value of a DC component which is an A/D conversion output to the control circuit 10. In addition, the sampling frequency Fs1 of the A/D converter 9 is lower than the sampling frequency Fs2 of the A/D converter 13.

The control circuit 10 generates a control signal S1 for adjusting the amplitudes of the baseband I and Q signals to a desired value, in response to the digital value of the DC component which is the A/D conversion output of the A/D converter 9, and outputs the generated control signal S1 to the I/Q signal generation circuit 1.

Thus, the I/Q signal generation circuit 1 can adjust the amplitudes of the baseband I and Q signals to be a desired value, in response to the control signal S1 generated by the control circuit 10. Accordingly, the transmission apparatus TX of the present embodiment can reduce the carrier leakage occurring in the high frequency transmission signal.

The capacitor 11 extracts the AC component of a high frequency by cutting off the DC component of a low frequency (frequency 0) from the square detection output signal of the square detection circuit 6, and outputs the extracted AC component to the variable gain amplifier 12.

The variable gain amplifier 12 changes a gain representing a ratio between the output signal and the input signal in response to a gain control signal S3, and amplifies the square detection output signal of the DC component which is extracted by the capacitor 11 by the gain according to the gain control signal S3 to output the amplified square detection output signal to the A/D converter 13. In addition, the gain control signal S3 may be input from outside the transmission apparatus TX illustrated in FIG. 1, or may be generated by, for example, the control circuit 14 and input from the control circuit 14.

The A/D converter 13 A/D converts the square detection output signal amplified by the variable gain amplifier 12 at a sampling frequency Fs2, and outputs a digital value of an AC component which is an A/D conversion output to the control circuit 14. In addition, the sampling frequency Fs2 of the A/D converter 13 is higher than the sampling frequency Fs1 of the A/D converter 9.

The control circuit 14 generates a control signal S2 for adjusting the balance of the amplitudes and the phases of the baseband I and Q signals and for reducing a DC offset of the I and Q signals, in response to the digital value of an AC component which is the A/D conversion output of the A/D converter 13, and outputs the generated control signal S2 to the PQ signal generation circuit 1.

Thus, the PQ signal generation circuit 1 can adjust the balance of the amplitudes and the phases of the baseband I and Q signals and reduce the DC offset of the I and Q signals, in response to the control signal S2 generated by the control circuit 14. Accordingly, the transmission apparatus TX of the present embodiment can reduce the image leakage occurring in the high frequency transmission signal.

The transmission apparatus TX of the present embodiment adjusts the power of the high frequency transmission signal generated by the modulator 2, in a first adjustment circuit (see a dotted line in FIG. 1) including the square detection circuit 6, the amplifier 7, the LPF 8, the A/D converter 9, and the control circuit 10. Further, the transmission apparatus TX adjusts the balance of the amplitudes and the phases of the I and Q signals generated by the PQ signal generation circuit 1 and the DC offset of the I and Q signals, in a second adjustment circuit (see an alternate long and short dash line in FIG. 1) including the square detection circuit 6, the capacitor 11, the variable gain amplifier 12, the A/D converter 13, and the control circuit 14.

In addition, I and Q signals having different DC and AC components of the square detection output signal of the square detection circuit 6 are used for the adjustment operation in the first adjustment circuit and the second adjustment circuit, and thus the adjustment operation is performed at a different timing.

For example, after the first adjustment circuit adjusts the amplitudes of the baseband I and Q signals to a desired value, the second adjustment circuit adjusts the balance of the amplitudes and phases and the DC offset of the baseband I and Q signals. Otherwise, after the second adjustment circuit adjusts the balance of the amplitudes and phases and the DC offset of the baseband I and Q signals, the first adjustment circuit adjusts the amplitudes of the baseband I and Q signals to a desired value.

Further, in the transmission apparatus TX of the present embodiment, when the second adjustment circuit adjusts the balance of the amplitudes and phases and the DC offset of the baseband I and Q signals generated by the I/Q signal generation circuit 1, the squared signal is used, and thus the square detection circuit 6 is used as the detection circuit of the high frequency transmission signal amplified by the power amplifier 3.

Thus, the transmission apparatus TX can share the directional coupler 4, the transmission channel 5, and the squared detection circuit 6 as a path for inputting the square detection output signal to the first adjustment circuit and the second adjustment circuit, and thus it is possible to minimize the transmission loss of the high frequency transmission signal, without providing circuit components for respectively inputting the square detection output signal to the first adjustment circuit and the second adjustment circuit.

Figure 3:
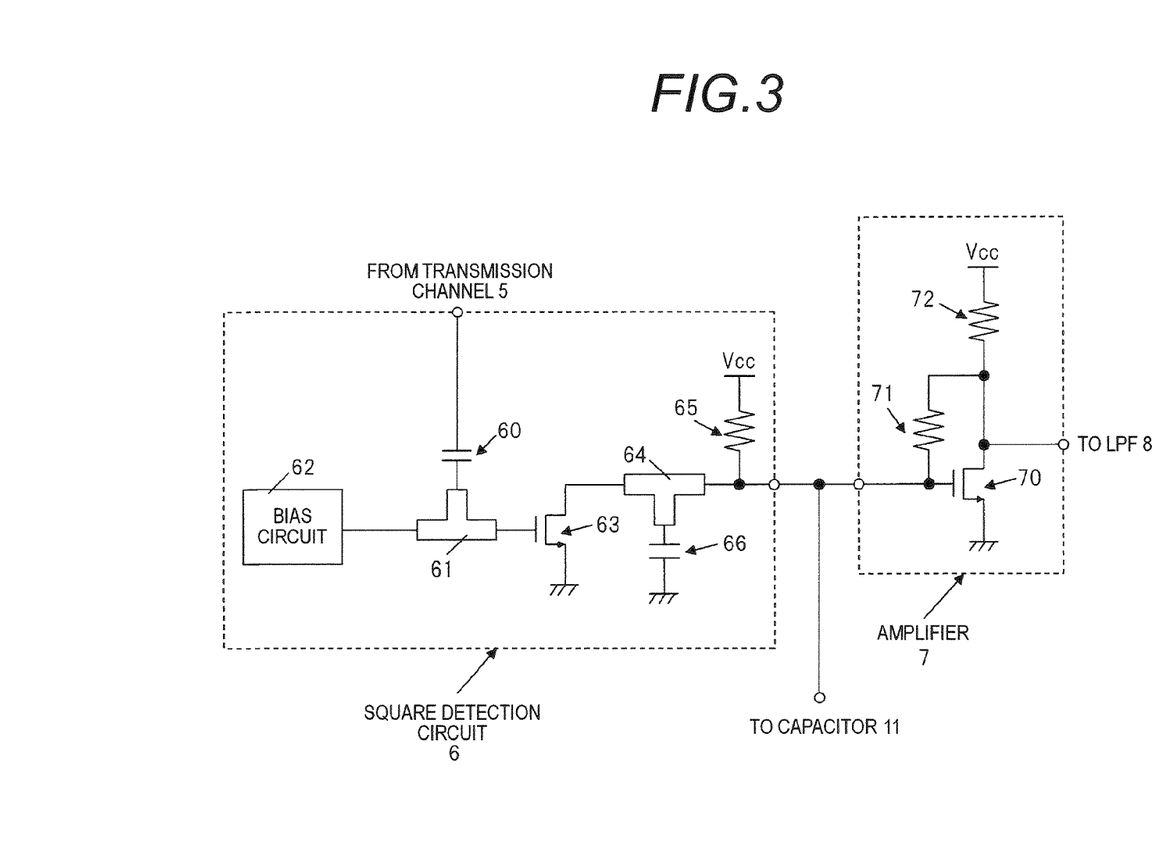
FIG. 3 is a diagram illustrating an example of circuit configurations of the square detection circuit and an amplifier of the present embodiment.

Further, although the square detection output signal of the square detection circuit 6 branches into two systems, the frequency component of 60 GHz is suppressed in the square detection circuit 6 (see FIG. 3). Therefore, the influence of the transmission loss due to the division of the square detection output signal of the square detection circuit 6 is small.

Further, since a signal path for the first adjustment circuit and a signal path for the second adjustment circuit are provided in the rear end of the square detection circuit 6, the respective sampling frequencies of the two A/D converters 9 and 13 are able to be respectively set not to be identical, and thus it is possible to avoid an unnecessary increase in power consumption.

Figure 2:
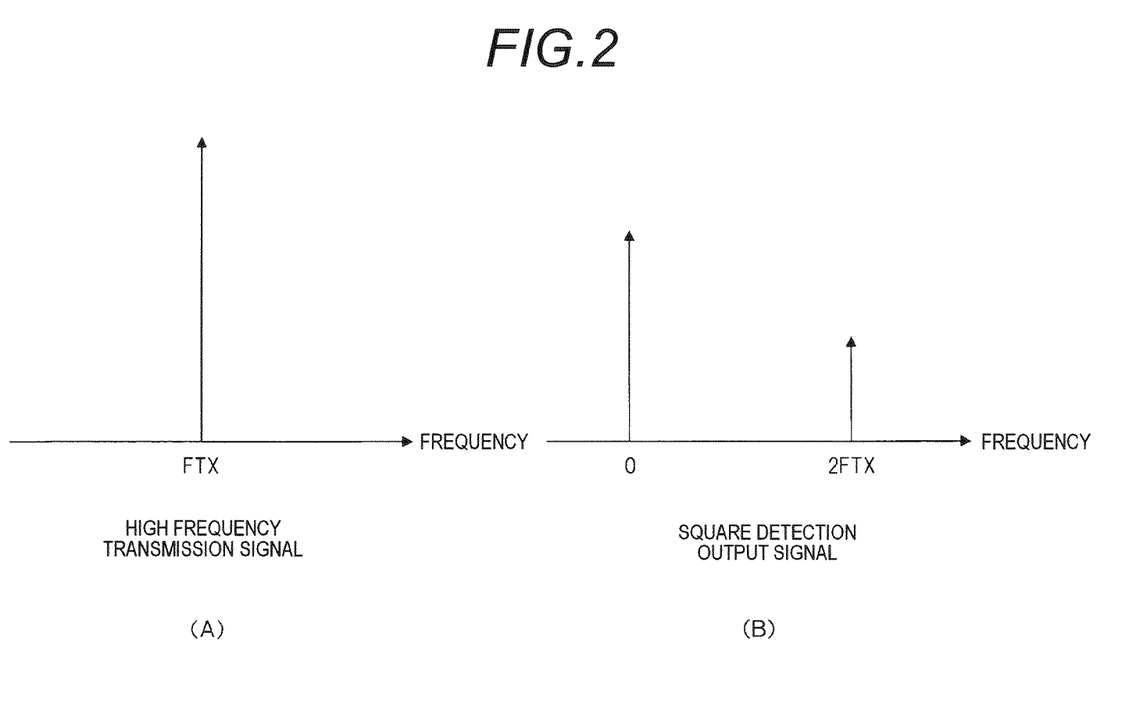

Next, the adjustment operation of the power of the high frequency transmission signal in the transmission apparatus TX will be described with reference to FIG. 2. In FIG. 2, (A) is a diagram illustrating a power spectrum of the high frequency transmission signal which is amplified by the power amplifier 3. In FIG. 2, (B) is a diagram illustrating a power spectrum of a square detection output signal of the square detection circuit 6.

If the high frequency transmission signal (frequency FTX) of the power spectrum illustrated in (A) of FIG. 2 is square-detected in the square detection circuit 6, the square detection output signal appears as a DC component (frequency 0) and a double frequency component (frequency 2FTX) of the high frequency transmission signal (see (B) of FIG. 2).

Strictly, the square detection output signal of the square detection circuit 6 appears as a frequency component of the baseband frequency FBB and a frequency component of 2FBB, in addition to the DC component (frequency 0) and the double frequency component (frequency 2FTX) of the high frequency transmission signal (see (B) of FIG. 6).

During the adjustment operation of the power of the high frequency transmission signal in the transmission apparatus TX, it may be considered that the I and Q signals do not exist, in other words, the frequency of the baseband I and Q signals is 0 (zero). Accordingly, in FIG. 2, (B) illustrates a power spectrum when the baseband frequency FBB is, for example, 0 (zero).

The LPF 8 suppresses the high frequency transmission signal of a double frequency component, and outputs the square detection output signal of the DC component to the A/D converter 9. The A/D converter 9 A/D converts the square detection output signal of the DC component.

Thus, since the square detection output signal of the DC component is input to the A/D converter 9, it is possible to sufficiently reduce the sampling frequency Fs1 of the A/D converter 9, thereby reducing the power consumption of the A/D converter 9.

The control circuit 10 generates a control signal S1 for adjusting the amplitudes of the baseband I and Q signals in order to minimize the digital value of the DC component to be input to the control circuit 10, in response to the digital value of the DC component which is the A/D conversion output of the A/D converter 9, and outputs the generated control signal S1 to the I/Q signal generation circuit 1. Thus, even if the power of the high frequency transmission signal changes from a desired value when the ambient temperature of the transmission apparatus TX changes, the control circuit 10 can control the power of the high frequency transmission signal to be a desired constant value.

Next, the adjustment operation of the balance of the amplitudes and phases and the DC offset of the baseband I and Q signals in the transmission apparatus TX will be described with reference to (B) of FIG. 6. When the tone signals FBB_I and FBB_Q of frequency FBB (for example, a few hundreds MHz) having a phase difference of 90 degrees are input to the modulator 2 from the I/Q signal generation circuit 1, the square detection output signal of the square detection circuit 6 appears as a signal of the respective frequency components illustrated in (B) of FIG. 6.

Since the capacitor 11 suppresses or removes the direct current (DC) component of the square detection output signal, the signal component of the frequency FBB and the signal component of the frequency 2FBB are input to the variable gain amplifier 12. In other words, the signal which is input to the variable gain amplifier 12 is not a signal in a broadband from a frequency 0 to a frequency of a few hundreds MHz. Thus, it is not necessary to design a broadband frequency characteristic as the frequency characteristic of the variable gain amplifier 12.

Since the A/D converter 13 A/D converts the signal of a few hundred MHz, the sampling frequency Fs2 is higher than the sampling frequency Fs1 so as to induce an increase in power consumption, but it is possible to maintain the increase in the power consumption at a minimum, by setting, for example, the number. of input bits to be smaller. In this case, since the dynamic range of the A/D converter 13 is narrowed, the variable gain amplifier 12 which is provided in the front end of the A/D converter 13 optimizes the amplitudes of the input signal depending on the dynamic range of the A/D converter 13. Thus, the detection range of the square detection circuit 6 is widened equivalently.

The control circuit 14 calculates a power spectrum on a frequency axis by performing a Fast Fourier Transform (FFT) on the component of the digital value of the AC component which is the A/D conversion output of the A/D converter 13.

The control circuit 14 adjusts the DC offset of the respective tone signals of frequencies FBB_I and FBB_Q so as to minimize the calculated power spectrum of the frequency FBB. Thus, the control circuit 14 can reduce the level of the carrier leakage occurring in the high frequency transmission signal.

Further, the control circuit 14 adjusts the balance of the phases and amplitudes of the respective tone signals of frequencies FBB_I and FBB_Q so as to minimize the calculated power spectrum of the frequency 2FBB, as a result of FFT. Thus, the control circuit 14 can reduce the level of the image leakage occurring in the high frequency transmission signal.

FIG. 3 is a diagram illustrating an example of circuit configurations of the square detection circuit 6 and the amplifier 7 of the present embodiment. The square detection circuit 6 illustrated in FIG. 3 includes a capacitor 60, a transmission channel 61, a bias circuit 62, a source-grounded transistor 63, a transmission channel 64, a resistor 65, and a capacitor 66. Further, the amplifier 7 illustrated in FIG. 3 includes a source-grounded transistor 70 and resistors 71 and 72.

The high frequency transmission signal which is input to the square detection circuit 6 from the transmission channel 5 is input to the gate terminal of the source-grounded transistor 63, through the capacitor 60 and the transmission channel 61 of the T-junction. The DC gate bias of the source-grounded transistor 63 is supplied from the bias circuit 62, and is applied to the gate terminal of the source-grounded transistor 63, through the transmission channel 61 of the T-junction. In addition, the bias circuit 62 supplies a DC gate bias voltage for causing the source-grounded transistor 63 to perform square detection to the gate terminal of the source-grounded transistor 63.

The drain terminal of the source-grounded transistor 63 is connected to the transmission channel 64 of the T-junction, and the source-grounded transistor 63 operates as a square detection element according to the DC gate bias supplied from the bias circuit 62.

One end of the transmission channel 64 is connected to a power supply Vcc through a resistor 65 for adjusting a level of the square detection output signal which is square-detected by the source-grounded transistor 63, and the square detection output signal is output from one end of the transmission channel 64.

Meanwhile, the other end of the transmission channel 64 is grounded through the capacitor 66 to cut-off the AC component of the high frequency signal. In other words, the capacitor 66 which is a ground capacitor element cuts-off or suppresses a signal of a specific frequency (for example, 60 GHz) in a high band of the square detection output signal which is square-detected by the source-grounded transistor 63. In addition, a signal with an inverted phase of the same frequency component (for example, 60 GHz band) as that of the high frequency transmission signal which is input to the square detection circuit 6 is output from the drain terminal of the source-grounded transistor 63, but is cut-off or suppressed by the capacitor 66.

The capacitance value of the capacitor 66 is a default value that is predetermined such that a signal of a specific frequency (for example, 60 GHz) of a high band of a square detection output signal which is square-detected by the source-grounded transistor 63 can be cut-off or suppressed. Thus, a signal of a high frequency (for example, a 60 GHz band) from the square detection output signal of the square detection circuit 6 can be suppressed.

The square detection output signal of the square detection circuit 6 branches into the capacitor 11 and the amplifier 7. The square detection output signal which is input to the amplifier 7 is input to the gate terminal of the source-grounded transistor 70. The drain terminal of the source-grounded transistor 70 is connected to the gate terminal through the resistor 71, and is connected to the power supply Vcc through the resistor 72 for adjusting the level of the signal amplified by the source-grounded transistor. The source-grounded transistor 70 outputs the output signal of the amplifier 7 from the drain terminal to the LPF 8.

Further, the amplifier 7 can set the gain of the amplifier 7 to be low, by a negative feedback between the gate terminal and the drain terminal of the source-grounded transistor 70 through the resistor 71. For example, it is possible to set the gain of the amplifier 7 to be 1.

Thus, since the dynamic range of the A/D converter 9 connected to the rear end of the amplifier 7 is a default value (for example, 1V), when the gain of the amplifier 7 is great, the signal level which is input to the A/D converter 9 becomes great. Since only the dynamic range of the A/D converter 9 can be digital-converted, the detection range of the square detection circuit 6 is equivalently narrowed.

However, in the present embodiment, since the gain of the amplifier 7 can be set to be low, the level of the signal which is input to the A/D converter 9 does not increase, the dynamic range of the A/D converter 9 is used efficiently, and thus the detection range of the square detection circuit 6 can be equivalently increased.

Thus, the transmission apparatus TX of the present embodiment extracts the DC component of the square detection output signal of the square detection circuit 6 to which the high frequency transmission signal is input, in the first adjustment circuit, and adjusts the amplitudes of the baseband I and Q signals to a desired value, in response to the A/D conversion output of the A/D converter 9 for the DC component.

Further, the transmission apparatus TX extracts the AC component of the square detection output signal of the square detection circuit 6 to which the high frequency transmission signal is input, in the second adjustment circuit, and adjusts the balance of the amplitudes and phases of the baseband I and Q signals and the DC offset of the baseband I and Q signals, in response to the A/D conversion output of the A/D converter 13 for the AC component.

Thus, since the transmission apparatus TX can suppress (reduce) the respective signal levels of the carrier leakage and the image leakage, it is possible to improve the modulation accuracy characteristic of the transmission signal in the modulator 2, thereby controlling the power of the high frequency transmission signal to be a constant value.

Although the various embodiments have been described with reference to the drawings, the present disclosure is not limited to the embodiments. It is obvious that various changes or modifications shall be appreciated by a person having an ordinary skill within the scope of the claims, and it is naturally understood that the various changes or modifications belong to the technical scope of the present disclosure.

The present application is based on Japanese Patent Application No. 2013-053820 filed on Mar. 15, 2013, the contents of which are incorporated herein by reference.

Industrial Applicability

The present disclosure is useful as a transmission apparatus which controls the power of a high frequency transmission signal to be a constant value, and controls a carrier leakage and an image leakage.

Reference Signs List
  1: I/Q SIGNAL GENERATION CIRCUIT
  2: MODULATOR
  3: POWER AMPLIFIER
  4: DIRECTIONAL COUPLER
  5: TRANSMISSION CHANNEL
  6: SQUARE DETECTION CIRCUIT
  7: AMPLIFIER
  8: LPF
  9, 13: A/D CONVERTER
  10, 14: CONTROL CIRCUIT
  11: CAPACITOR
  12: VARIABLE GAIN AMPLIFIER
  Ant: TRANSMISSION ANTENNA
  TX: TRANSMISSION APPARATUS

The invention claimed is:

1. A transmission apparatus comprising:
   a modulator that modulates a local oscillator signal by using an in-phase signal and a quadrature signal of a baseband, and generates a high frequency signal;
   a power amplifier that amplifies the generated high frequency signal;
   a coupler that extracts a portion of the high frequency signal, from the amplified high frequency signal;
   a detection circuit that detects the extracted high frequency signal;
   a first adjustment circuit that extracts a DC component from a detection output of the detection circuit, and adjusts respective amplitudes of the in-phase signal and the quadrature signal of the baseband, in response to the extracted DC component; and
   a second adjustment circuit that extracts an AC component from the detection output of the detection circuit, and adjusts an amplitude, a phase and a DC offset of the in-phase signal and the quadrature signal of the baseband, in response to the extracted AC component.

2. The transmission apparatus according to claim 1, wherein
   the first adjustment circuit includes:
      an amplifier that amplifies the detection output of the detection circuit;
      a filter that extracts the DC component from the amplified detection output of the detection circuit;
      a first A/D converter that A/D converts an output of the filter; and
      a first control circuit that adjusts the amplitudes of the in-phase signal and the quadrature signal of the baseband in response to an output of the first A/D converter, and
   the second adjustment circuit includes:
      a capacitor that extracts the AC component from the detection output of the detection circuit;
      a variable gain amplifier that amplifies the AC component;
      a second A/D converter that A/D converts the amplified AC component; and
      a second control circuit that adjusts the amplitude, the phase and the DC offset of the in-phase signal and the quadrature signal of the baseband in response to an output of the second A/D converter.

3. The transmission apparatus according to claim 2, wherein a sampling frequency of the first A/D converter is lower than a sampling frequency of the second A/D converter.

4. The transmission apparatus according to claim 2, wherein the detection circuit includes:
   a capacitor that suppresses the DC component of the extracted high frequency signal;
   a source-grounded transistor of which a gate is connected to the capacitor;
   a bias circuit that supplies a direct gate bias voltage for square-detecting the extracted high frequency signal, to the gate of the source-grounded transistor; and a grounded capacitor element that is connected to a drain of the source-grounded transistor, and suppresses an AC component of a specific frequency.

5. The transmission apparatus according to claim 2, wherein the amplifier includes:
a source-grounded transistor; and
a resistor connected to a gate and a drain of the source-grounded transistor.

* * * * *